United States Patent [19]

Bibayan

[11] Patent Number: 5,537,521
[45] Date of Patent: Jul. 16, 1996

[54] METHOD AND APPARATUS FOR DEFINING AND DISPLAYING EXTRACTED IMAGES IN WINDOWING ENVIRONMENTS

[75] Inventor: Farzad Bibayan, Irvine, Calif.

[73] Assignee: Canon Kabushiki Kaisha, Tokyo, Japan

[21] Appl. No.: 5,987

[22] Filed: Jan. 19, 1993

[51] Int. Cl.$^6$ .................................................. G06T 11/00
[52] U.S. Cl. ........................... 395/133; 395/135; 395/141; 395/159
[58] Field of Search ........................... 395/131, 133–139, 395/141, 121, 122, 145, 147, 152, 155, 159; 358/500, 501, 515, 517, 538

[56] References Cited

U.S. PATENT DOCUMENTS

| | | | |
|---|---|---|---|
| 4,845,549 | 7/1989 | Someya | 358/515 |
| 4,954,970 | 9/1990 | Walker et al. | 395/131 |
| 4,975,768 | 12/1990 | Takaraga | 358/538 |
| 5,041,992 | 8/1991 | Cunningham et al. | 395/141 X |
| 5,220,646 | 6/1993 | Fossum | 395/122 |
| 5,313,227 | 5/1994 | Aoki et al. | 395/135 X |
| 5,335,095 | 8/1994 | Kageyama et al. | 358/538 |
| 5,398,309 | 3/1995 | Atkins et al. | 395/133 X |

*Primary Examiner*—Almis R. Jankus
*Attorney, Agent, or Firm*—Fitzpatrick, Cella, Harper & Scinto

[57] ABSTRACT

A method and apparatus for defining and displaying an irregular bitmap on a display device context using a rectangular source bitmap creates a working bitmap from a source bitmap for the window it will be displayed on. A black and white mask of the source bitmap is created and then an inverse black and white mask of the source bitmap is created. A bitmap is created with a background color the same as the background color of the window and the irregular bitmap in black, and a bitmap is created with a black background and the irregular bitmap in its original color. A rectangular bitmap is then created with its background color set to the window background color and the irregular bitmap in its original color, and the bitmap is displayed on the window. Lastly, the unneeded bitmaps and device contexts are deleted and the display device context is released.

27 Claims, 3 Drawing Sheets

METHOD AND APPARATUS FOR DEFINING AND DISPLAYING EXTRACTED IMAGES IN WINDOWING ENVIRONMENTS

BACKGROUND OF THE INVENTION

1. Field of the Invention

The present invention relates generally to a method and apparatus for defining and displaying extracted images in windowing environments, and more particularly for defining and displaying non-rectangular bitmaps in a display device context using a rectangular bitmap.

2. Description of the Prior Art

A bitmap is a pixel-by-pixel definition of an image, and is used to express the information needed to display an image. Typically, the bitmap provides a designation of the display state for each pixel of the image. For a monochrome display, this merely involves specifying whether each pixel is turned on or off. For a color display, however, a display color must be specified for each pixel. There are many applications for imaging a bitmap on a display device. For example, bitmaps can be used to define one or more icons in a windowing environment, such as, for example, Microsoft Windows®. As the applications for windowing environments become more sophisticated, there is an increasing demand to express information in a very easy-to-understand manner. Icons are well-suited to graphically express information in such a manner.

Often images, such as icons, are nonrectangular, or irregular, in shape so as to accurately represent an image and easily convey an associated function to the user. However, bitmaps are conventionally specified as rectangular regions in most bitmap files, e.g., ".BMP" or ".PCX" files which are industry standard formats for bitmap files. Therefore, the pixels of a rectangular region which are not part of the image must be set to the same color as the window background so that the image will stand out clearly.

However, the window background color may be altered, as commonly occurs in windowing environments. In that situation, if the rectangular structure of the bitmap is not altered, the displayed image will look "dirty" because the portion of the rectangular bitmap surrounding the irregular image will have a different color than the color of the window background. Therefore, before an irregular bitmap image, such as, for example, an icon, is displayed, it is preferable to alter the rectangular structure of the stored bitmap.

The subject invention is directed to a novel and unique method and apparatus for defining an irregular bitmap in a rectangular bitmap structure and for displaying the irregular bitmap on a display screen in windowing environments. The subject invention also has broader applications for extracting one or more images defined within a bitmap.

SUMMARY OF THE INVENTION

Accordingly, it is a general object of the present invention to provide a method and apparatus for defining and displaying a non-rectangular bitmap on a display device context using a rectangular bitmap.

It is another object of the invention to define a non-rectangular bitmap from a rectangular bitmap.

It is another object of the invention to define and display a non-rectangular bitmap on a display device context in a windowing environment wherein the background color of the window is user-selectable.

It is still another object of the invention to define and display an extracted image on a display device context in a windowing environment using a rectangular bitmap.

It is yet another object of the invention to define and display one or more images extracted from a rectangular bitmap on a display device context.

In accordance with one aspect of the invention, a method for defining and displaying irregular bitmaps on a display device context using a rectangular bitmap in windowing environments comprises the steps of creating a working bitmap from a source bitmap for a window on which the bitmap will be displayed, creating a black and white mask of the source bitmap, creating an inverse black and white mask of the source bitmap, creating a bitmap with a background color the same as a background color of the window and with the irregular bitmap in black, creating a bitmap with a black background and with the irregular bitmap in its original color, and creating a rectangular bitmap with its background color set to the window background color and with the irregular bitmap in its original color. The newly created bitmap may be displayed onto the window, and all unneeded bitmaps and device contexts may be destroyed and the display device context released.

In accordance with another aspect of the invention, an apparatus for defining and displaying an irregular bitmap on a display device context in a windowing environment using a rectangular bitmap comprises an input device for inputting information, a memory device for storing information, a processor executing the steps of creating a working bitmap from a source bitmap for a window on which the bitmap will be displayed, creating a black and white mask of the source bitmap, creating an inverse black and white mask of the source bitmap, creating a bitmap with a background color the same as the background color of the window and with the irregular bitmap in black, creating a bitmap with a black background and with the irregular bitmap in its original color, and creating a rectangular bitmap with its background color set to be the window background color and with the irregular bitmap in its original color. The processor may display the newly created bitmap on the window, and may delete all unneeded bitmaps and device contexts and release the display device context.

In accordance with still another aspect of the invention, a method for defining and displaying one or more extracted images on a display device context using a rectangular bitmap in windowing environments comprises the steps of creating a 5 working bitmap from a source bitmap for a window on which the extracted image will be displayed, creating a black and white mask of the source bitmap, creating an inverse black and white mask of the source bitmap, creating a bitmap with a background color the same as a background color of the window and with the extracted image in black, creating a bitmap with a black background and with the extracted image in its original colors, and creating a rectangular bitmap with its background color set to the window background color and with the extracted image in its original colors. The newly created bitmap may be displayed onto the window, and all unneeded bitmaps and device contexts may be deleted and the display device context may be released.

In accordance with yet another aspect of the invention, an apparatus for defining and displaying one or more extracted images on a display device context in a windowing environment using a rectangular bitmap comprises an input device for inputting information, a memory device for storing information, a processor executing the steps of creating a working bitmap from a source bitmap for a window on which the extracted image will be displayed, creating a black and white mask of the source bitmap, creating an inverse black and white mask of the source bitmap, creating a bitmap with a background color the same as the background color of the window and with the extracted image in black, creating a bitmap with a black background and with the extracted image in its original colors, and creating a rectangular bitmap with its background color set to be the window background color and with the extracted image in its original colors. The processor may display the newly created bitmap on the window, and it may delete all unneeded bitmaps and device contexts and release the display device context.

These and other objects, aspects, features and advantages of the present invention will become apparent from the following detailed description of the preferred embodiments taken in conjunction with the accompanying drawings.

DESCRIPTION OF THE PREFERRED EMBODIMENTS

The method and apparatus of the subject invention is particularly suited for defining and displaying an irregular bitmap on a display device context using a rectangular bitmap. As an example for illustrating the disclosed method and apparatus, a bitmap defining a green trash can as an irregular bitmap on a yellow rectangular background is to be displayed in a windowing environment having a display screen with a blue background. However, also within the scope of the subject invention is a broader application for extracting one or more subimages from a bitmap defining a plurality of images.

As discussed above, the structure of most bitmap files is rectangular. Therefore, to define a bitmap in irregular, or non-rectangular shapes, the subject invention distinguishes between relevant and non-relevant pixels within the rectangular bitmap.

Rectangular bitmaps represent a pixel-by-pixel designation of a display color for each pixel of a rectangular shape. Some of those pixels define an irregular image, while other pixels form the background of the image. To represent irregular shapes, or images, on a display device, the background pixels within the rectangular bitmap will be indicated as non-relevant. A non-relevant pixel is a pixel that is defined in the rectangular bitmap but which will be ignored when creating, or displaying, the irregular bitmap. In other words, the non-relevant pixels are not needed to represent the image and will be designated as the same color as that of a display screen shown in the windowing environment, i.e., the background color. In this way, it will appear that only the irregularly-shaped bitmap is shown on the display screen. If the color of the display screen changes, the color of the non-relevant pixels will change accordingly so only the irregular image appears on the screen.

Figure 1:
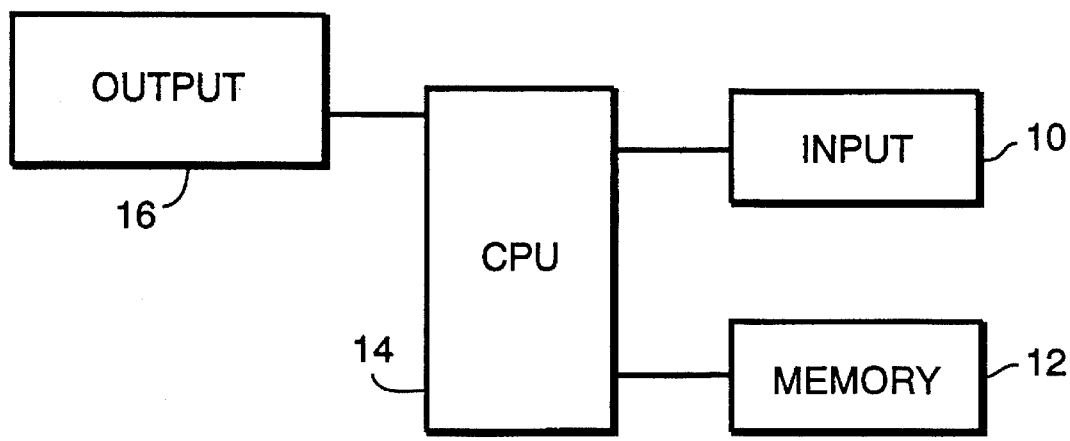
FIG. 1 is a block diagram of a computer system in accordance with the present invention.

FIG. 1 is a block diagram of a computer generally comprising an input device 10, such as a keyboard, for inputting information, a memory device 12, such as a RAM, for storing information, and a central processing unit (CPU) 14 for processing information to define and display an irregular bitmap in a windowing environment. An output device 16, such as a display screen or a printer, is connected to the CPU for outputting the processed information. As will be appreciated, each of the elements shown in block outline in FIG. 1 is well known per se, and a specific type of construction is not critical to carrying out the invention or to a disclosure of the best mode for carrying out the invention.

Figure 2:
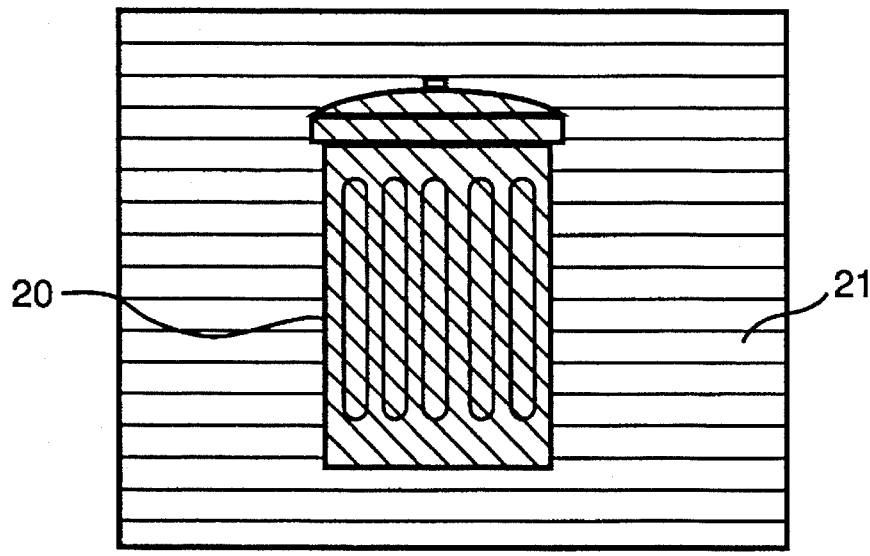
FIG. 2 illustrates a bitmap displayed on a display screen in accordance with the present invention.

FIG. 2 shows the trash can displayed on a display screen of the output device 16 in a windows environment in accordance with the subject invention. As will be appreciated, FIG. 2 illustrates what will actually appear on the display screen. In terms of the example, in FIG. 2 the trash can 20 is green and the window background 21 is blue. FIGS. 3(a) through 3(e) are representations of the bitmap at various stages of the disclosed method. These representations are not actually shown or displayed on the output device but are provided herein for explanation purposes.

Figure 4:
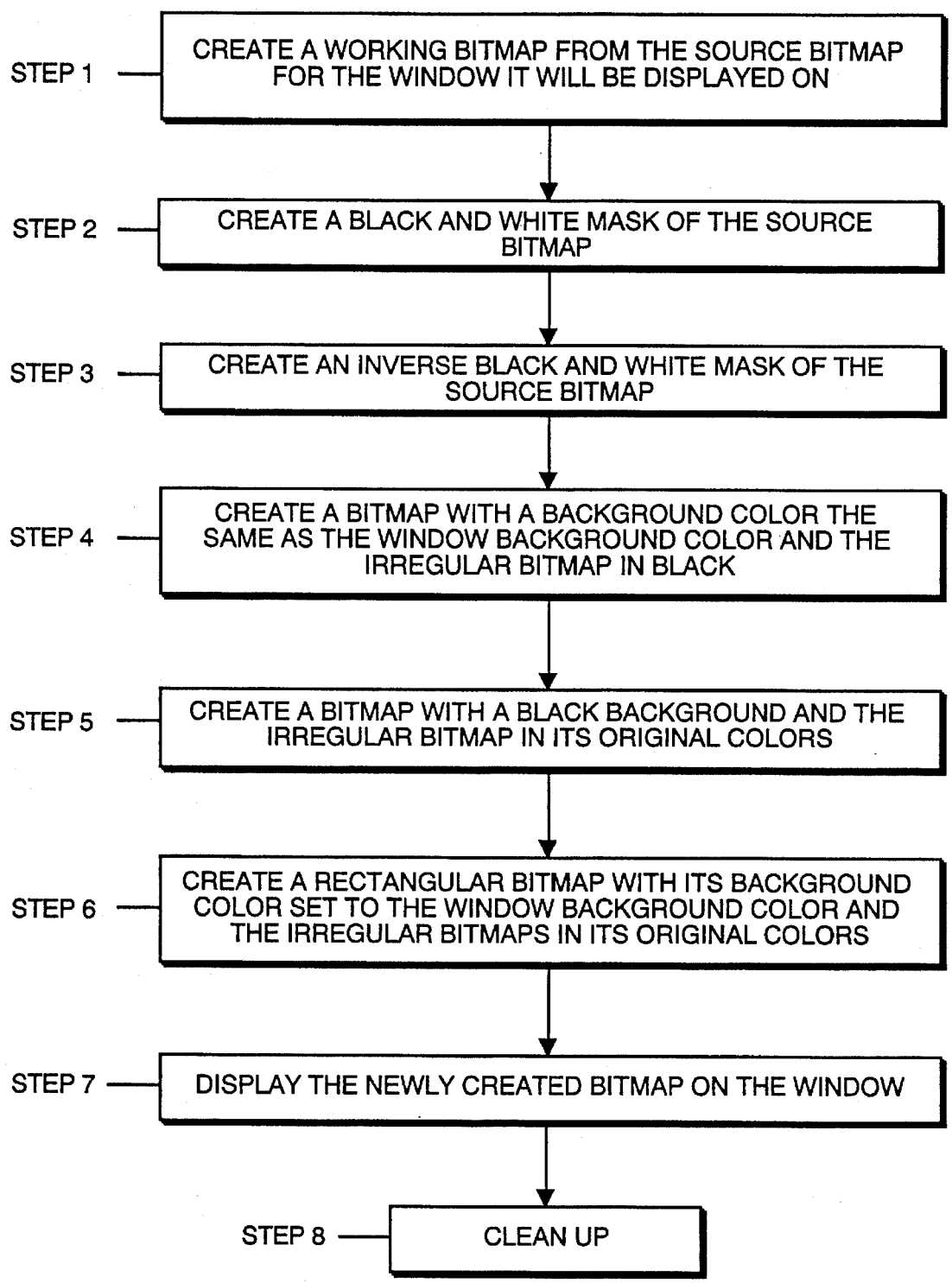
FIG. 4 is a flow chart showing the process steps of the present invention.

In accordance with the subject invention, there are eight basic steps required to display an irregular bitmap on a display device context using a rectangular bitmap. The process steps are shown in a flow chart in FIG. 4. The rectangular bitmap will be referred to hereinafter as a source bitmap since the source bitmap is what is stored in the bitmap files.

As used herein, a device context is a piece of memory or a memory object for a particular device. Thus, a device context for a display output device is a display device context. In order to do any type of displaying or drawing it is necessary to use such a memory, which serves as a representation of a device.

The first general step (Step 1) is to create a working bitmap from the source bitmap for the window on which the bitmap will be displayed. This is accomplished by first creating a device context compatible with the display device context. The newly created compatible device context will be referred to as the working device context. The working device context is a "working" model of the display device context. A compatible device context as used herein refers to a memory device context with the same attributes as the device for which a virtual device is created. A source bitmap is then selected into the working device context. This lets the working device context know that the source bitmap is the object to be worked on. Next, a mapping mode of the working device context is set to the mapping mode of the display device context. The mapping mode defines how an image should be drawn, or interpreted, on the display screen. Since the created working device context should behave the same as the display device context, the mapping mode of the working device context is set to be the same as the mapping mode of the display device context.

The background color of the working device context is then saved. For example, in the example if a green trash can on a yellow background is to be displayed on a blue window, then the yellow background color is saved. Next, the background color of the working device context is set to the replacing color, which will be the background color of the window. In this example, therefore, the yellow background color of the bitmap is set to blue.

Figure 3A:
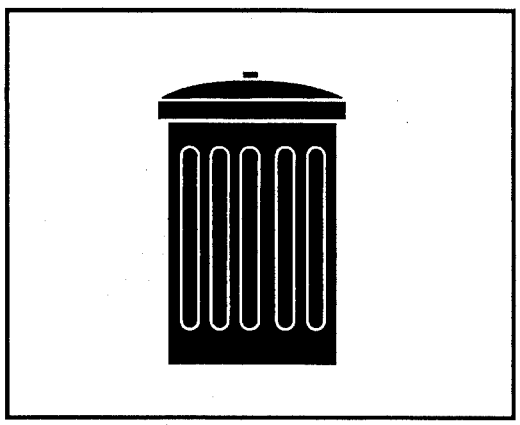
FIGS. 3(a) through 3(e) are illustrative diagrams showing the color schemes of a bitmap during different steps of the method of the present invention.

In Step 2 a black and white mask of the source bitmap is created. To accomplish this, a monochrome memory device context compatible with the display device context is created. This context is referred to as the monochrome device context. A monochrome bitmap compatible with the width and height of the source bitmap is then created. This bitmap has the same dimensions as the source bitmap but is empty, i.e., does not contain any bitmap information. The monochrome bitmap is then selected into the monochrome device context. This informs the monochrome device context that the monochrome bitmap is the object to be worked on. Finally in step two, the bitmap in the working device context is drawn on the monochrome device context using a raster operator that copies the working bitmap to the monochrome bitmap. The raster operator is a code that operates how to combine the bitmaps with each other. This operation creates a black and white bitmap where the background is white and the irregular bitmap is entirely black. This bitmap will later be used as a mask. To elaborate on this operation, the working bitmap is drawn on the black and white bitmap. While the working bitmap has colors, the resultant bitmap will be a black and white copy. Therefore, the outcome will be a white background with a black irregular bitmap. In terms of the example, the result will be a black trash can on a white background as shown in FIG. 3(a). The black and white bitmap will be used as a mask later in the process.

Figure 3B:
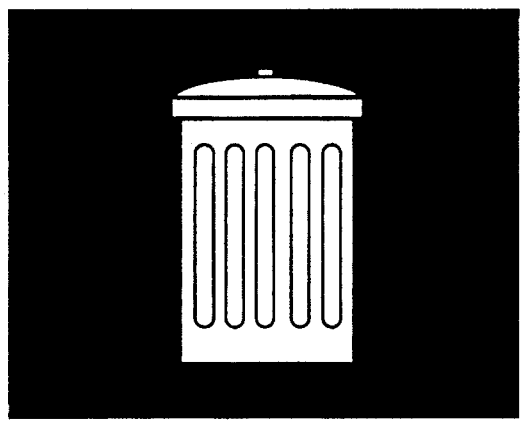

The next general step (Step 3) is to create an inverse black and white mask of the source bitmap. This general step is first initiated by setting the background color of the working device context to its original color that was saved earlier, i.e., yellow. Then a monochrome memory device context compatible with the display device context is created. This step is identical to the creation of the monochrome memory device context as discussed above with respect to creating a black and white mask of the source bitmap. This newly created memory device context will be referred to as the inverse monochrome device context. The next step is to create a monochrome bitmap compatible with the source bitmap in width and height. In other words, create an empty bitmap with no information on the bitmap but with the same dimensions as the source bitmap. Then the newly created monochrome bitmap is selected into the inverse monochrome device context to let it know that this bitmap is the object to be worked on. Next, the bitmap in the monochrome device context is drawn on the inverse monochrome device context using the raster operator that copies the inverted source bitmap to the monochrome bitmap. This operation creates a black and white bitmap where the background is black and the irregular bitmap is entirely white and is an inverse mask of the monochrome device context. In the example, this process creates a white trash can on a black background as shown in FIG. 3(b). This bitmap is also used as a mask later in the process.

Figure 3C:
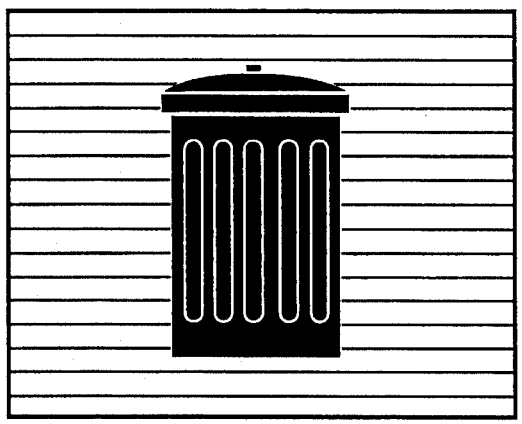

The fourth general step (Step 4) is to create a bitmap with a background color the same as the window background color and with the irregular bitmap, i.e., the trash can, in black. This is done by first creating a memory device context compatible with the display device context and known as a destination device context. A bitmap compatible with the source bitmap in width and height is created. This bitmap is then selected into the destination device context. The background color of the destination device context is then set to the background color of the display device context. In the example, the background color of the destination device context would be set to blue. Then the bitmap in the monochrome device context is drawn onto the destination device context using the raster operator to combine pixels of the destination bitmap and the source bitmap by using the boolean AND operator. This creates a bitmap with a background color the same as the window background color, i.e., blue, and the irregular bitmap in black as shown in FIG. 3(c).

Figure 3D:
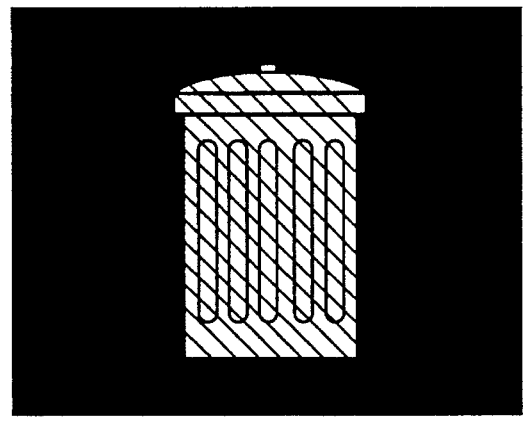

The next general step (Step 5) is to create a bitmap with a black background and with the irregular bitmap in its original color. This is done by using the raster operator to draw the bitmap in the inverse monochrome device context onto the working device context. The raster operator combines pixels of the destination and source bitmaps by using the boolean AND operator. This creates a bitmap with a black background and with the irregular bitmap in its original color of green as shown in FIG. 3(d).

The sixth general step (Step 6) is to create a rectangular bitmap with its background color set to the window background color and with the irregular bitmap in its original color. This step requires the bitmap in the working device context to be drawn on the destination device context using the raster operator that combines pixels of the destination source bitmap and the source bitmap by using the boolean OR operator. This operation creates a rectangular bitmap with its background color set to the window background, i.e., blue, and an irregular bitmap as specified in the source bitmap, i.e., green in color. The resultant bitmap is shown in FIG. 3(e).

Figure 3E:
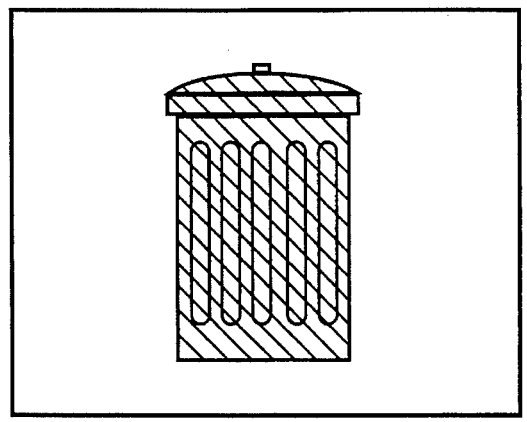

The next step (Step 7) is to display the newly created bitmap as shown in FIG. 3(e) onto the window by drawing the bitmap from the destination device context onto the display context. FIG. 2 shows the displayed bitmap.

The final step (Step 8) is to clean up by deleting all unneeded bitmaps such as those shown in FIGS. 3(a) through 3(e) and all unneeded device contexts. In addition, the display device context is released.

As discussed above, the subject application has a broader application in extracting one or more images from a bitmap. If the irregular bitmap is thought of as a single image, the subject invention provides a method for extracting that image from the rectangular bitmap and displaying it on an output device. If a bitmap contains a plurality of images, then the same disclosed method can be used to extract one or more images from the bitmap and display the extracted images on the output device. For example, if a bitmap contained several sub-images such as a pen, a trash can and an expanded file, all of different colors, on a rectangular background, any one or more of the sub-images could be extracted and displayed using the disclosed method of the invention.

Although specific embodiments of the present invention has been described above in detail, it will be understood that this description is merely for purposes of illustration. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A method for defining and displaying non-rectangular irregularly-shaped bitmap on a display device context using a rectangular bitmap in a windowing environment, said method comprising the steps of:

creating a working bitmap from a source bitmap for a window which will display the irregularly-shaped bitmap; creating a black and white mask compatible with the source bitmap;

creating an inverse black and white mask compatible with the source bitmap;

creating a bitmap with a background color the same as a background color of the window and with the irregularly-shaped bitmap in black;

creating a bitmap with a black background and with the irregularly-shaped bitmap in its original color; and creating a rectangular bitmap with its background color set to the window background color and with the irregularly-shaped bitmap in its original color.

2. A method as recited in claim 1, wherein creating a working bitmap from the source bitmap for the window which will display the irregularly-shaped bitmap comprises the steps of:

creating a working device context compatible with the display device context;

selecting the source bitmap into the working device context;

setting a mapping mode of the working device context to a mapping mode of the display device context;

saving the background color of the working device context; and setting the background color of the working device context to a replacing color.

3. A method as recited in claim 1, wherein creating a black and white mask compatible with the source bitmap comprises the steps of:

creating a monochrome device context compatible with the display device context;

creating a first monochrome bitmap compatible with the width and height of the source bitmap;

selecting the first monochrome bitmap into the monochrome device context; and drawing the bitmap in the working device context on the monochrome device context to create a bitmap with a white bitmap background and a black irregularly-shaped bitmap.

4. A method as recited in claim 1, wherein creating an inverse black and white mask compatible with the source bitmap comprises the steps of:

setting the background color of the working device context to its original color;

creating an inverse monochrome device context compatible with the display device context;

creating a second monochrome bitmap compatible with the width and height of the source bitmap;

selecting the second monochrome bitmap into the inverse monochrome device context; and drawing the bitmap in the monochrome device context on the inverse monochrome device context to create a bitmap with a black bitmap background and a white irregularly-shaped bitmap.

5. A method as recited in claim 1, wherein creating a bitmap with a background color the same as the window background color and the irregularly-shaped bitmap in black comprises the steps of:

creating a destination device context compatible with the display device context;

creating a bitmap compatible with the source bitmap;

selecting the bitmap into the destination device context;

setting the background color of the destination device context to the background color of the display device context; and drawing the bitmap in the monochrome device context onto the destination device context.

6. A method as recited in claim 1, wherein creating a bitmap with a black background and the irregularly-shaped bitmap in its original color comprises the step of drawing the bitmap in the inverse monochrome device context onto the working device context.

7. A method as recited in claim 1, wherein creating a rectangular bitmap with a background color set to the window background color and the irregularly-shaped bitmap in its original color comprises the step of drawing the bitmap in the working device context onto the destination device context.

8. A method as recited in claim 1, further comprising the step of displaying the newly created bitmap onto the window.

9. A method as recited in claim 8, wherein displaying the newly created bitmap on the window comprises the steps of drawing the bitmap from the destination device context onto the display context.

10. A method as recited in claim 1, further comprising the step of deleting all created bitmaps and device contexts and releasing the display device context.

11. An apparatus for defining and displaying a non-rectangular irregularly-shaped bitmap on a display device context in a windowing environment using a rectangular bitmap, comprising:

an input device for inputting information;

a memory device for storing information; and a processor executing the steps of creating a working bitmap from a source bitmap for a window which will display the irregularly-shaped bitmap, creating a black and white mask compatible with the source bitmap, creating an inverse black and white mask compatible with the source bitmap, creating a bitmap with a background color the same as the background color of the window and with the irregularly-shaped bitmap in black, creating a bitmap with a black background and with the irregularly-shaped bitmap in its original color, and creating a rectangular bitmap with its background color set to the window background color and with the irregularly-shaped bitmap in its original color.

12. An apparatus as recited in claim 11, wherein said processor displays the newly created bit map on the window.

13. An apparatus as recited in claim 11, wherein said processor deletes all unneeded bitmaps and device contexts and releases the display device context.

14. A method for defining and displaying at least one extracted image on a display device context using a rectangular bitmap in a windowing environment, said method comprising the steps of:

creating a working bitmap from a source bitmap for a window which will display the extracted image;

creating a black and white mask compatible with the source bitmap;

creating an inverse black and white mask compatible with the source bitmap;

creating a bitmap with a background color the same as a background color of the window and with the extracted image in black;

creating a bitmap with a black background and with the extracted image in its original colors; and creating a rectangular bitmap with its background color set to the window background color and with the extracted image in its original colors.

15. A method as recited in claim 14, wherein creating a working bitmap from the source bitmap for the window which will display the extracted image comprises the steps of:

creating a working device context compatible with the display device context;

selecting the source bitmap into the working device context;

setting a mapping mode of the working device context to a mapping mode of the display device context;

saving the background color of the working device context; and setting the background color of the working device context to a replacing color.

16. A method as recited in claim 14, wherein creating a black and white mask compatible with the source bitmap comprises the steps of:

creating a monochrome device context compatible with the display device context;

creating a first monochrome bitmap compatible with the width and height of the source bitmap;

selecting the first monochrome bitmap into the monochrome device context; and drawing the bitmap in the working device context on the monochrome device context to create a bitmap with a white bitmap background and a black extracted image.

17. A method as recited in claim 14, wherein creating an inverse black and white mask compatible with the source bitmap comprises the steps of:

setting the background color of the working device context to its original color;

creating an inverse monochrome device context compatible with the display device context;

creating a second monochrome bitmap compatible with the width and height of the source bitmap;

selecting the second monochrome bitmap into the inverse monochrome device context; and drawing the bitmap in the monochrome device context on the inverse monochrome device context to create a bitmap with a black bitmap background and a white extracted image.

18. A method as recited in claim 14, wherein creating a bitmap with a background color the same as the window background color and the extracted image in black comprises the steps of:

creating a destination device context compatible with the display device context;

creating a bitmap compatible with the source bitmap;

selecting the bitmap into the destination device context;

setting the background color of the destination device context to the background color of the display device context; and drawing the bitmap in the monochrome device context onto the destination device context.

19. A method as recited in claim 14, wherein creating a bitmap with a black background and the extracted image in its original colors comprises the step of drawing the bitmap in the inverse monochrome device context onto the working device context.

20. A method as recited in claim 14, wherein creating a rectangular bitmap with a background color set to the window background color and the extracted image in its original colors comprises the step of drawing the bitmap in the working device context onto the destination device context.

21. A method as recited in claim 14, further comprising the step of displaying the newly created bitmap onto the window.

22. A method as recited in claim 21, wherein displaying the newly created bitmap on the window comprises the steps of drawing the bitmap from the destination device context onto the display device context.

23. A method as recited in claim 14, further comprising the step of deleting all created bitmaps and device contexts and releasing the display context.

24. An apparatus for defining and displaying one or more extracted images on a display device context in a windowing environment using a rectangular bitmap, comprising:

an input device for inputting information;

a memory device for storing information; and a processor executing the steps of creating a working bitmap from a source bitmap for a window which will display the extracted image, creating a black and white mask compatible with the source bitmap, creating an inverse black and white mask compatible with the source bitmap, creating a bitmap with a background color the same as the background color of the window and with the extracted image in black, creating a bitmap with a black background and with the extracted image in its original color, and creating a rectangular bitmap with its background color set to the window background color and with the extracted image in its original colors.

25. An apparatus as recited in claim 24, wherein said processor displays the newly created bitmap on the window.

26. An apparatus as recited in claim 24, wherein said processor deletes all unneeded bitmaps and device contexts and releases the display device context.

27. An apparatus for defining and displaying a non-rectangular irregularly-shaped bitmap on a display device context in a windowing environment using a rectangular bitmap, comprising:

a memory device for storing information; and a processor executing the steps of creating a working bitmap from a source bitmap for a window which will display the irregularly-shaped bitmap, creating a black and white mask compatible with the source bitmap, creating an inverse black and white mask compatible with the source bitmap, creating a bitmap with a background color the same as the background color of the window and with the irregularly-shaped bitmap in black, creating a bitmap with a black background and with the irregularly-shaped bitmap in its original color, and creating a rectangular bitmap with its background color set to the window background color and with the irregularly-shaped bitmap in its original color.

* * * * *